P. GUZMAN.

No. 120,379.  Patented Oct. 31, 1871.

DYNAMOTOR.

Illustration of the principle.

Side-view.

Section.

UNITED STATES PATENT OFFICE.

PETER GUZMAN, OF PARIS, FRANCE.

IMPROVEMENT IN MOTORS.

Specification forming part of Letters Patent No. 120,379, dated October 31, 1871; antedated October 21, 1871.

*To all whom it may concern:*

Figure 1:
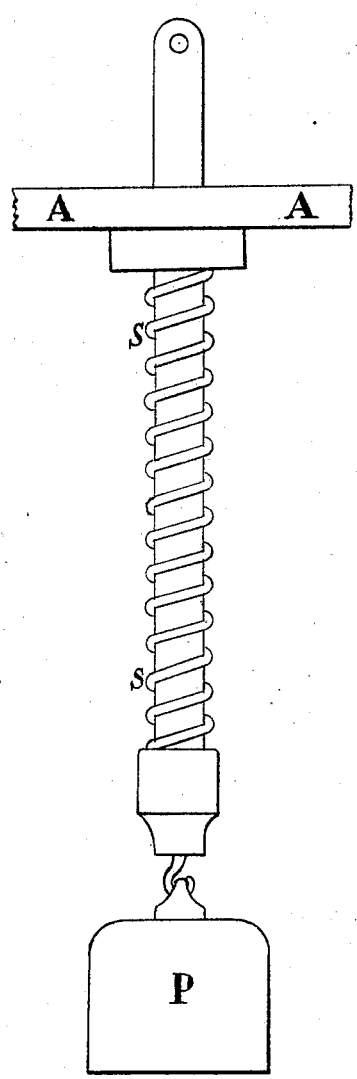
Figure 2:
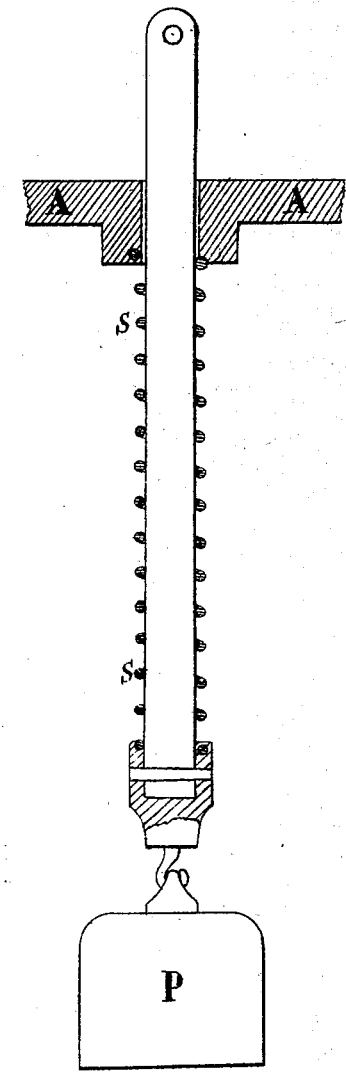

Be it known that I, PETER GUZMAN, of Paris, France, have invented a new motor that I call Dynamotor, and of which the following is a specification:

Figure 1 is a side view. Fig. 2 is a section.

A weight, P, rests on a spring, S, which bears on a stand, A. When this stand is at rest the weight remains in a certain position. If the stand receives vertical alternative motions the weight P oscillates up and down of its initial position. When the motion of the stand is the effect of a natural force the oscillation of the weight can be used as a motor to drive the piston of a pump or any other suitable mechanism. The spring may be substituted for whatever elastic body, such as that of steam, compressed air, &c., or by a counter-weight.

For example, if the stand A A is supported by a ship rolling at sea, the alternate motions due to the power of the waves oscillate the weight P. The inertia of this weight in such movements constitutes a motor. By applying its action to the piston of a pump the extent of the oscillation will be lessened in proportion to the work done.

The plate A A is intended to be held and balanced with the hand. The vertical rod shows, then, the respective positions of the plate and of the suspended weight, and gives readily the data required for the calculation of the power of inertia.

I claim as my invention—

Using as a motor the inertia of balancing masses, compensated, as to their weight, by an elastic action, as explained above.

P. GUZMAN.

Witnesses:
   G. T. NORTON,
   G. NAPHEZZI.

(67)